(12) United States Patent
Gardezi

(10) Patent No.: US 12,074,887 B1
(45) Date of Patent: Aug. 27, 2024

(54) SYSTEM AND METHOD FOR SELECTIVELY PROCESSING CONTENT AFTER IDENTIFICATION AND REMOVAL OF MALICIOUS CONTENT

(71) Applicant: FireEye, Inc., Milpitas, CA (US)

(72) Inventor: Muhammad Zain ul abadin Gardezi, Milpitas, CA (US)

(73) Assignee: Musarubra US LLC, Plano, TX (US)

( * ) Notice: Subject to any disclaimer, the term of this patent is extended or adjusted under 35 U.S.C. 154(b) by 113 days.

(21) Appl. No.: 16/231,089

(22) Filed: Dec. 21, 2018

(51) Int. Cl.
*H04L 9/40* (2022.01)
*G06F 9/54* (2006.01)

(52) U.S. Cl.
CPC ............ *H04L 63/1416* (2013.01); *G06F 9/54* (2013.01); *H04L 63/20* (2013.01)

(58) Field of Classification Search
None
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

"Definition—What does parse mean?" [online] Mar. 23, 2017, Techopedia. [retrieved on Jul. 6, 2020]. Retrieved from https://www.techopedia.com/definition/3853/parse (Year: 2017).*

(Continued)

*Primary Examiner* — Taghi T Arani
*Assistant Examiner* — Joshua Raymond White
(74) *Attorney, Agent, or Firm* — Rutan & Tucker, LLP

(57) ABSTRACT

A system and method directed toward the deployment of one or more security plug-ins for software components (e.g., applications) that analyze incoming content and selectively prevent malicious portions of the content from being processed by the applications without limiting the processing and/or rendering of the legitimate (non-malicious) portions of the incoming content is described. Each of the security plug-ins is communicatively coupled to a published interface of a software component, such as an application. The security plug-in includes logic to (i) gain access to content received by the software component prior to processing of the content by the software component, (ii) parse the content into separate segments, (iii) analyze each content segment to determine whether the content segment is malicious or non-malicious, and (iv) permit rendering of one or more non-malicious content segments while preventing processing of one or more malicious content segments.

20 Claims, 8 Drawing Sheets

(56) References Cited

U.S. PATENT DOCUMENTS

| | | |
|---|---|---|
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,180,761 B1* | 5/2012 | Cooley ............... G06F 16/951 707/709 |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,448,241 B1* | 5/2013 | Kadakia ............... G06F 11/3688 726/22 |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |

(56) References Cited

U.S. PATENT DOCUMENTS

| | | |
|---|---|---|
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,990,945 B1 * | 3/2015 | Ranadive ............ H04L 63/1433 713/188 |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,357,394 B1 * | 5/2016 | Filatov ................. H04L 63/306 |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,838,418 B1 * | 12/2017 | Wardle ................. G06F 21/56 |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |

(56) References Cited

U.S. PATENT DOCUMENTS

| | | | |
|---|---|---|---|
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,241,696 B1 * | 3/2019 | Kowalyshyn ........... G06F 21/62 |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Achman et al. |
| 2002/0169952 A1 | 11/2002 | DiSanto et al. |
| 2002/0184528 A1 | 12/2002 | Shevenell et al. |
| 2002/0188887 A1 | 12/2002 | Argman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0177397 A1 * | 9/2003 | Samman ............... G06F 21/564 726/24 |
| 2003/0188190 A1 | 10/2003 | Aaron et al. |
| 2003/0191957 A1 | 10/2003 | Hypponen et al. |
| 2003/0200460 A1 | 10/2003 | Vorota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |

(56) References Cited

U.S. PATENT DOCUMENTS

| | | |
|---|---|---|
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Fisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0064369 A1* | 3/2010 | Stolfo ............... G06F 21/562 726/24 |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0191849 A1* | 8/2011 | Jayaraman ........ H04L 63/1416 715/205 |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |

(56) References Cited

U.S. PATENT DOCUMENTS

| | | |
|---|---|---|
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0265588 A1* | 10/2012 | Kannan ............... G06Q 30/02 705/14.4 |
| 2012/0266244 A1 | 10/2012 | Green et al. |
| 2012/0278886 A1 | 11/2012 | Luna |
| 2012/0296713 A1* | 11/2012 | Abdulhayoglu ... G06Q 30/0277 705/14.4 |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2017/0097740 A1* | 4/2017 | Kimber ................. G06F 40/143 |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |
| 2019/0141013 A1* | 5/2019 | Mail ................... H04L 63/0263 |
| 2019/0171817 A1* | 6/2019 | Jaroch .................. G06F 21/566 |
| 2019/0347407 A1* | 11/2019 | Beskrovny ............ G06F 21/566 |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Mining Specification of Malicious Behavior"—Jha et al, UCSB, Sep. 2007 https://www.cs.ucsb.edu/.about.chris/research/doc/esec07.sub.-mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xp/articleDetails.sp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).

(56) References Cited

OTHER PUBLICATIONS

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I., "PyFlag—An advanced network forensic framework", Digital investigation 5, Elsevier, (2008), pp. S112-S120.

Costa, M., et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].

Heng Yin et al., Panorama: Capturing System-Wide Information Flow for Malware Detection and Analysis, Research Showcase @ CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Idika et al., A-Survey-of-Malware-Detection-Techniques, Feb. 2, 2007, Department of Computer Science, Purdue University.

Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.

Kaeo, Merike, "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., "Analyzing and exploiting network behaviors of malware.", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.-N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham, "Insertion, Evasion, and Denial of Service: Eluding Network Intrusion Detection", Secure Networks, ("Ptacek"), (Jan. 1998).

Venezia, Paul, "NetDetector Captures Intrusions", InfoWorld Issue 27, ("Venezia"), (Jul. 14, 2003).

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

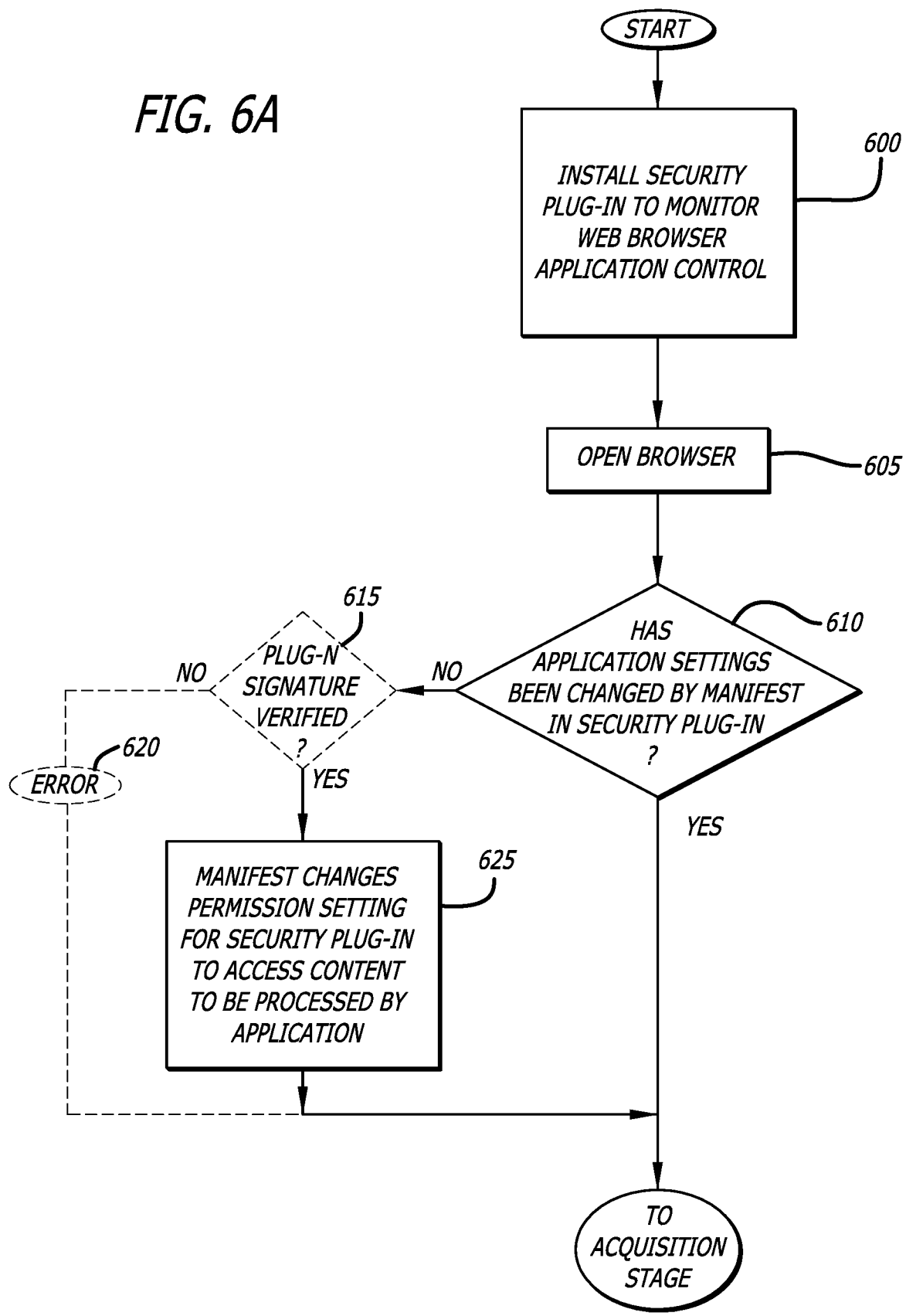

SYSTEM AND METHOD FOR SELECTIVELY PROCESSING CONTENT AFTER IDENTIFICATION AND REMOVAL OF MALICIOUS CONTENT

FIELD

Embodiments of the disclosure relate to cyber security. More particularly, embodiments of the disclosure relate to a system and method to selectively control the processing and/or rendering of content.

GENERAL BACKGROUND

Over the last decade, computers have been increasingly targeted for a cyberattack, particularly those that access the Internet or other publicly accessible networks. In general, one type of cyberattack may involve the insertion of malicious code into otherwise legitimate content to be processed by a user, for example, content (specifically referred to as "web content") being transferred over a network, and processed by a web browser application. The malicious code corresponds to malware, which may take the form of one or more instructions or commands, a script, or a program that is harmful by design to a computer. For example, the malicious code may operate as a virus, adware, spyware, and any other type of malware that gathers or attempts to steal information from a computer or about its user or otherwise operates without permission. The computer user is often unaware that the malicious code is present in the web content which, automatically or triggered from a user action (e.g., selection of a displayable image on a web page), is installed into memory of the computer.

In some cases, as an exploit cyberattack may be conducted, namely an attempt, normally through unsuspecting uploading of an exploit (e.g., malicious instruction(s) or command(s)), to take advantage of a vulnerability in a targeted computer by adversely influencing or attacking normal operations of that computer. Typically, exploit attacks are directed to a vulnerability associated with a specific software application such as a web browser application (e.g., Microsoft® Internet Explorer®, Google® Chrome®, etc.), a document reader application (e.g., portable document format "PDF" reader), or a document editor application (e.g., Microsoft® Office®, Apple® TextEdit®, Adobe® Acrobat®, etc.).

Recently, various processes have been employed to detect or prevent security threats. For example, computers may run "blocking" software that scans incoming content received by a particular computer for adware and blocks the display of the advertisement generated by the adware. The scanning typically constitutes a "static analysis" by comparing incoming content to signatures of known adware maintained within a library or database of adware signatures, where such analysis alone may lead to an increased number of false negatives. However, where the content includes malicious software (referred to as "malware") that may cause malicious communications or activities that initiate or further an attack (hereinafter, "cyberattack"), current threat detection processes feature no flexibility as to rendering a portion of the content free from malicious software. For instance, for a compromised web page including a malicious code segment in an otherwise clean page for legitimate purposes, for conventional approaches, the entire web page is precluded from being rendered.

BRIEF DESCRIPTION OF THE DRAWINGS

Embodiments of the disclosure are illustrated by way of example and not by way of limitation in the figures of the accompanying drawings, in which like references indicate similar elements and in which:

FIG. 6A is exemplary embodiment of a flow diagram of the operations conducted during the Set-up stage of FIG. 5.

DETAILED DESCRIPTION

Figure 1:
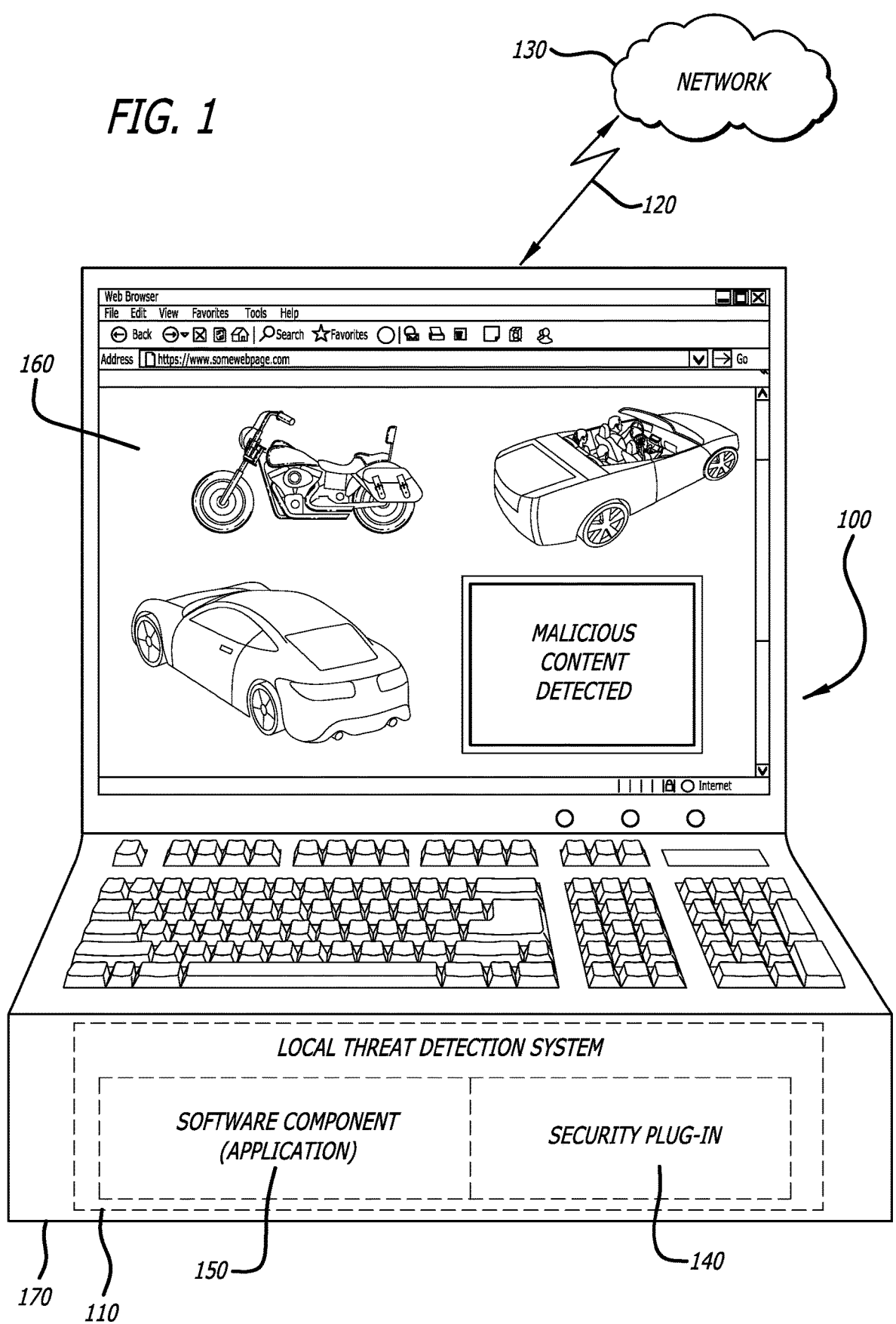
FIG. 1 is an exemplary block diagram of an embodiment of an electronic device configured with a local threat detection system.

Various embodiments of the disclosure are directed to a system and/or method for deploying one or more security plug-ins for software components (e.g., applications such as web browsers). Each security plug-in is configured to analyze content and selectively prevent advanced cyberattacks or remediate their effects without limiting the processing and/or rendering of legitimate (non-malicious) portions of the content. Stated differently, the security plug-in may remove malicious content associated with a cyberattack, and in some cases, substitute the malicious content for trusted content. As a result, the web page may be loaded and an legitimate (non-compromised) website, from which the web page is provided, may be browsed. Examples of the advanced cyberattacks may include (a) malicious Uniform Resource Locator (URL) for use in the retrieval of malware onto a computer for theft of confidential information or for rendering the computer inoperable, (b) drive-by attack where content is downloaded by processing the webpage which drops (generates) a malicious process, (c) image with an embedded malicious exploit that performs malicious tasks, or (d) an interactive screen seeking sensitive information as part of phishing attack for example.

After installation into an electronic device, each of the security plug-ins operates with a counterpart software module. More specifically, each security plug-in is configured for communicative coupling with a standard, published interface made available by its counterpart software component, such as a software application (e.g., web browser application, document reader application, document editor application, etc.). Such applications are conventional and often widely used. The standard, published interface for each software application may correspond to an application programming interface (API) specific for that software application. As a result, when installed and in operation, each security plug-in monitors the specified API of its counterpart software component in order to intercept content prior to processing by the software component to perform a security analysis.

In some embodiments, the security plug-in may be configured to operate via a separate process with the counterpart application. Communications between the security plugin operating in a separate process and the counterpart application may be affected through operating system communication techniques instead of APIs. Such operating systems communication techniques enable two distinct applications to affect one another without operating in the same context. For example, an endpoint security agent operating as a security plug-in, through operating system interfaces, may identify signaling of a counterpart application indicating processing of content, such as HTML data, an Adobe® Portable Document Format ("PDF") document, or the like. The content may be analyzed to detect malicious code segments for mitigation by the security plug-in.

According to one embodiment of the disclosure, each security plug-in is configured with logic to (i) gain access to content associated with a web page received by the software component (e.g., web browser application) prior to processing of that content, (ii) parse the content, during loading, into different segments, where each segments may pertain to a different category or type of information to be analyzed using a particular threat detection rule, (iii) analyze each content (code) segment to produce analytic results, and (iv) based on the analytic results, permit the processing of non-malicious content segments while preventing the processing of malicious content segments. In addition, each security plug-in may be further configured with (i) logic that generates alerts with at least a portion of the analytic results that overlay a displayed image including content segment and/or (ii) logic to perform remediation operations, which may vary depending on the type of content determined to be malicious. Where applicable, as part of remediation operations, any malicious content segment may be either (i) removed from the monitored content (e.g., web page, file, document) prior to processing or (ii) altered to change certain operability of the monitored content (e.g., made dormant such as disabling URL links, etc.). The removal of the detected malicious content segment may be favored to prevent the rendering of a displayable element associated with the malicious content segment and, depending on the type of malicious content (e.g., a displayable image), another content segment may be substituted for the removed content segment.

For instance, for web page content, the substitution of one or more malicious content segments may be performed in order to complete the web page. According to one embodiment of the disclosure, each substitute content segment may correspond to an advertisement image (linked or static) for which advertisers may subscribe to a service that updates a collection of substitute content segments that are made available to the security plug-ins. However, according to another embodiment of the disclosure, each substitute content segment may correspond to a pre-stored image being substituted into the web page for the malicious content segment and/or providing a warning that a portion of the content has been determined to be malicious.

To assist in understanding aspects of the invention, an illustrative embodiment of the operations of a threat detection system utilizing a security plug-in framework is described. Herein, one or more security plug-ins may be installed into an endpoint device, where each security plug-in operates with a counterpart software application. As an example, a first security plug-in may operate with a web browser application, where the first security plug-in is configured to monitor (e.g., intercept and analysis) content received by the web browser application for processing (e.g., execution of received content associated with a web page for display). The first security plug-in may gain access to the content via a published interface for that web browser application (e.g., API). The first security plug-in separates the received content (e.g., code to be processed for rendering a web page) into individual segments (hereinafter, "content segments") and analyzes each of the content segments to determine its cybersecurity classification (e.g., malicious, non-malicious).

According to one embodiment of the disclosure, analysis logic within the first security plug-in analyzes a content segment by at least identifying the type of content segment being analyzed and then comparing the content segment to regular expressions being part of the threat detection rules utilized by the analysis logic for that particular content type. The regular expressions may correspond to an abstract representation, which may include Boolean elements, groupings and/or qualifiers, to identify a set of characters (meta information) associated with known malicious content to avoid specific static rules. Upon determining that the content segment is malicious, the first security plug-in may selectively prohibit further processing of this content segment by the web browser (e.g., block further processing of the content imported through an Inline Frame "IFrame", prevent display of a malicious image in document being rendered, etc.). For remediation, if available, a malicious content segment may be substituted for another content segment, where the substitute content segment may include (i) a paid advertisement obtained from a data store that is periodically or aperiodically uploaded with substitute content segments or (ii) a pre-stored image. The data store may be local to the first security plug-in or may be remotely located therefrom.

In some embodiments, in lieu of regular expressions, the comparison may be conducted through a hash comparison. More specifically, the analysis logic within the first security plug-in may conduct a hash operation on a content segment for comparison with known malicious content (code) segments, which were previously determined to include malware used in conducting a cyberattack.

Herein, the security plug-in operates in cooperation with a software component (e.g., browser application). However, it is contemplated that the security plug-in may be a separate unit of commerce, sold or provided as freeware, by a software vendor distinct from the vendor of the software component. The security plug-in may be capable of being updated separately from the software component and employs current security information, e.g., threat detection rules which may include regular expressions. In other words, the security plug-in provides functionality without the need to replace or alter the software component, and may be configured in light of the threat landscape with the latest threat detection rules and customized with respect to, for example, alert rules.

More specifically, in some embodiments, the security plug-ins may be obtained separately from the software components already installed within an electronic device, such as via a network provided service. Stated differently, the security plug-in may be obtained from a web-based service (e.g., dedicated web server, cloud service, etc.) for installation and communicative coupling with a software component already installed within the electronic device. However, in another embodiment, the security plug-in may be integrated as part of the software component. Furthermore, the security plug-in may be configured to communicate with a remotely located threat analytics system, which is configured to receive results from analyses of content segments conducted by the security plug-in and, upon detection of a malicious content segment, generate an alert message to other endpoint devices communicatively coupled to the threat analytics system. The threat analytics system may be further configured to conduct a secondary analysis of the content segment through threat classification as well as update logic with the security plug-in (e.g., rules, manifest, notification logic, etc.).

According to another embodiment of the disclosure, in lieu of a security plug-in operating in cooperation with a software component (e.g., browser application), the security plug-in may be deployed as a software agent installed on an endpoint separate from the software component (e.g., browser application), where the software agent is situated to monitor the operation of the browser application and intercept downloaded webpages for analysis and blocking.

In summary, this security plug-in framework provides legacy and third party application software with cybersecurity functionality, such as cyber-threat detection and prevention for example, without modification of the application software. The cyber-threat detection and prevention includes analyzing and selectively preventing malicious content (code) segments from being processed without limiting access to (or rendering of) the legitimate (non-malicious) content. Depending on the type of malicious content segment, the security plug-in may selectively suppress a rendering of content associated with a malicious content segment and replace this content segment with a notice or benign substituted content (e.g., an image, Flash® file, JavaScript® block or the like which may or may not operate as an advertisement). Additionally, or in the alternative, a separate alert message may be issued to a user or administrator. By selectively blocking and/or suppressing received malicious content without interfering with the legitimate received content, the system enables a user to have safe access to legitimate content—providing a less intrusive cyber-threat protection of the system and user.

I. TERMINOLOGY

In the following description, certain terminology is used to describe various features of the invention. For example, the terms "logic," "module" and "component" are representative of hardware, firmware or software that is configured to perform one or more functions. As hardware, logic (or component) may include circuitry having data processing or storage functionality. Examples of such circuitry may include, but are not limited or restricted to a hardware processor (e.g., microprocessor with one or more processor cores, a digital signal processor, a graphics processing unit (GPU), a programmable gate array, a microcontroller, an application specific integrated circuit "ASIC", etc.), a semiconductor memory, or combinatorial elements.

Logic (or module or component) may be software that includes code being one or more instructions, commands or another data structure that, when compiled and/or processed (e.g., executed), performs a particular operation or a series of operations. Examples of software may include an application, a process, an instance, an Application Programming Interface (API), a subroutine, a plug-in, a function, an applet, a servlet, a routine, code, a script, a shared library/dynamic link library (dll), or a collection of HTML elements. This software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or engine/component) may be stored in persistent storage.

The term "content" generally relates to a collection of information, whether in transit (e.g., over a network) or at rest (e.g., stored), often having a logical structure or organization that enables it to be classified for purposes of analysis for cyber-threat detection and prevention. One type of content includes information that, when processed, produces a web page, where such information may include one or more Uniform Resource Locators (URLs) and/or one or more data elements (referred to as "web page content"). Examples of different types of data elements may include an embedded executable (e.g., a script, JavaScript block, Flash file, etc.) or a non-executable. Examples of non-executables may include a displayable image. Other types of content may include a document (e.g., a Portable Document Format "PDF" document, Microsoft® Office® document, Microsoft® Excel® spreadsheet, etc.), a file retrieved from a file storage system, or the like.

The term "electronic device" should be generally construed as electronics with data processing capability and/or a capability of connecting to any type of network, such as a public network (e.g., Internet), a private network (e.g., a wireless data telecommunication network, a local area network "LAN", etc.), or a combination of networks. Examples of an electronic device may include, but are not limited or restricted to, the following: a server, a mainframe, a firewall, a router; or an endpoint device (e.g., a laptop, a smartphone, a tablet, a desktop computer, a netbook, gaming console, a medical device, or any general-purpose or special-purpose, user-controlled electronic device).

The term "plug-in" may be broadly construed as a software module that is typically separate from a software component, such as a software application for example, and provides specific functionality to that software component. Various types of plug-ins, for example, may be available for use by different software components, such as web browser application for example, to add certain functionality. As an illustrative example, a security plug-in provides cyber-threat detection and prevention functionality for a software component, where the threat detection and prevention functionality may include analyses of content segments in efforts to detect maliciousness prior to the processing of such content segment(s) by the software component and potential remediation operations to eradicate any malicious content segments and optionally swap substitute content segments for the malicious content segment. For this example, the content segment(s) may be received via a published interface (API) for the software application. The plug-in may operate as an extension, add-in, add-on or another type of software module.

According to one embodiment, the term "malware" may be broadly construed as any content (e.g., code, data, command(s), etc.) that prompts or assists in conducting a cyber-attack and/or operations associated with anomalous or unwanted behavior. For instance, malware may correspond to a type of code intended to harm or co-opt operation of an electronic device or misappropriate, modify or delete data. In the alternative, malware may correspond to an exploit itself, namely (i) content that attempts to take advantage of a vulnerability in a software component and/or (ii) an action by a person gaining unauthorized access to one or more areas of an electronic device, where the exploit causes the electronic device to experience undesirable or anomalous behaviors. The undesirable or anomalous behaviors may include a communication-based anomaly or an execution-based anomaly which, for example, could (1) alter the functionality of an electronic device in an atypical manner or (2) provide unwanted functionality which may be generally acceptable in another context.

The term "interconnect" may be construed as a physical or logical communication path between two or more electronic devices or between different logic (engine or components). For instance, a physical communication path may include wired or wireless transmission mediums. Examples of wired transmission mediums and wireless transmission mediums may include electrical wiring, optical fiber, cable, bus trace, a radio unit that supports radio frequency (RF) signaling, or any other wired/wireless signal transfer mechanism. A logical communication path may include any mechanism that allows for the exchange of content between different logic.

The term "message" generally refers to signaling (wired or wireless) as either information placed in a prescribed format and transmitted in accordance with a suitable delivery protocol or information made accessible through a logical data structure such as an API. Examples of the delivery protocol include, but are not limited or restricted to HTTP (Hypertext Transfer Protocol); HTTPS (HTTP Secure); Simple Mail Transfer Protocol (SMTP); File Transfer Protocol (FTP); iMESSAGE; Instant Message Access Protocol (IMAP); or the like. Hence, each message may be in the form of one or more packets, frame, or any other series of bits having the prescribed, structured format. The term "computerized" generally represents that any corresponding operations are conducted by hardware in combination with software or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. GENERAL ENDPOINT DEVICE ARCHITECTURE

Referring now to FIG. 1, an exemplary block diagram of an embodiment of an electronic device 100 (e.g., endpoint device) is shown, where the endpoint device 100 is implemented with a local threat detection system 110. The local threat detection system 110 is configured to detect whether any portion or portions of content is malicious prior to the processing of the content by a software component 150. As an illustrative example, incoming content 120 associated with one or more web pages may be received from a web server being part of a network 130 to which the endpoint device 100 is connected. Operating as part of the local threat detection system 110, a security plug-in 140 is installed within the endpoint device 100 to be communicatively coupled to the software component 150 (e.g., web browser application) in order to monitor receipt of the web page content 120, parse the web page content 120 into a plurality of content segments, and analyze these content segments for a presence of malicious content (malware) prior to their processing by the web browser application 150.

More specifically, the security plug-in 140 is configured to determine maliciousness of each content segment in accordance with threat detection rules that may differ based on content type. For instance, one content type is directed to a "header" portion of the web page content 120, including a title and/or meta information associated with the web page. Other content types involve content within the body portion of the webpage, including an IFrame being a Hypertext Markup Language "HTML" document embedded inside another HTML document, a Flash file, JavaScript block, displayable image, or the like. In particular, the security plug-in 140 determines (1) whether any of the one or more content segments is malicious, and if so, (2) what remediation actions may be taken performed by the security plug-in 140 (besides removal of the content segment from the web page content 120) prior to processing by the web browser application 150. Examples of an remediation action may include, but are not limited or restricted to replacing the malicious content segment with a prescribed (non-malicious) content such as a static or linked displayable image to be rendered on a display 160 such as an advertisement or a warning (as shown), especially when the malicious content segment is a displayable image within the content 120 forming the web page. Another remediation action may include replacing content, such as substituting malicious content segment associated with a redirected web page, which may be hidden within the web page content 120, with a static warning notice to be rendered on the display 160. The notice may identify to the viewer of an attempted malicious redirect, but allow the viewer to see and navigate the web page.

Figure 2:
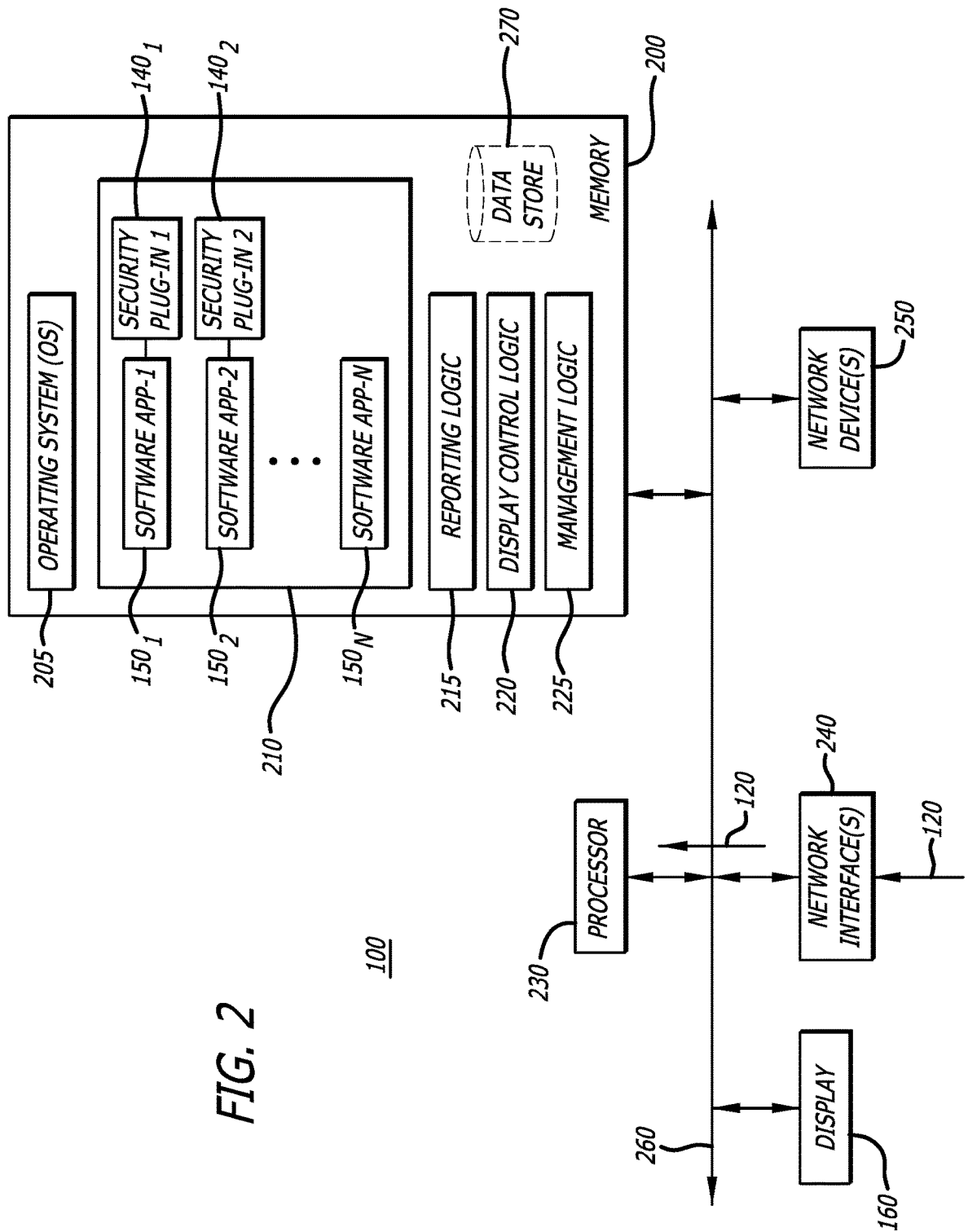
FIG. 2 is an illustrative embodiment of the internal architecture of the endpoint device of FIG. 1.
Figure 3:
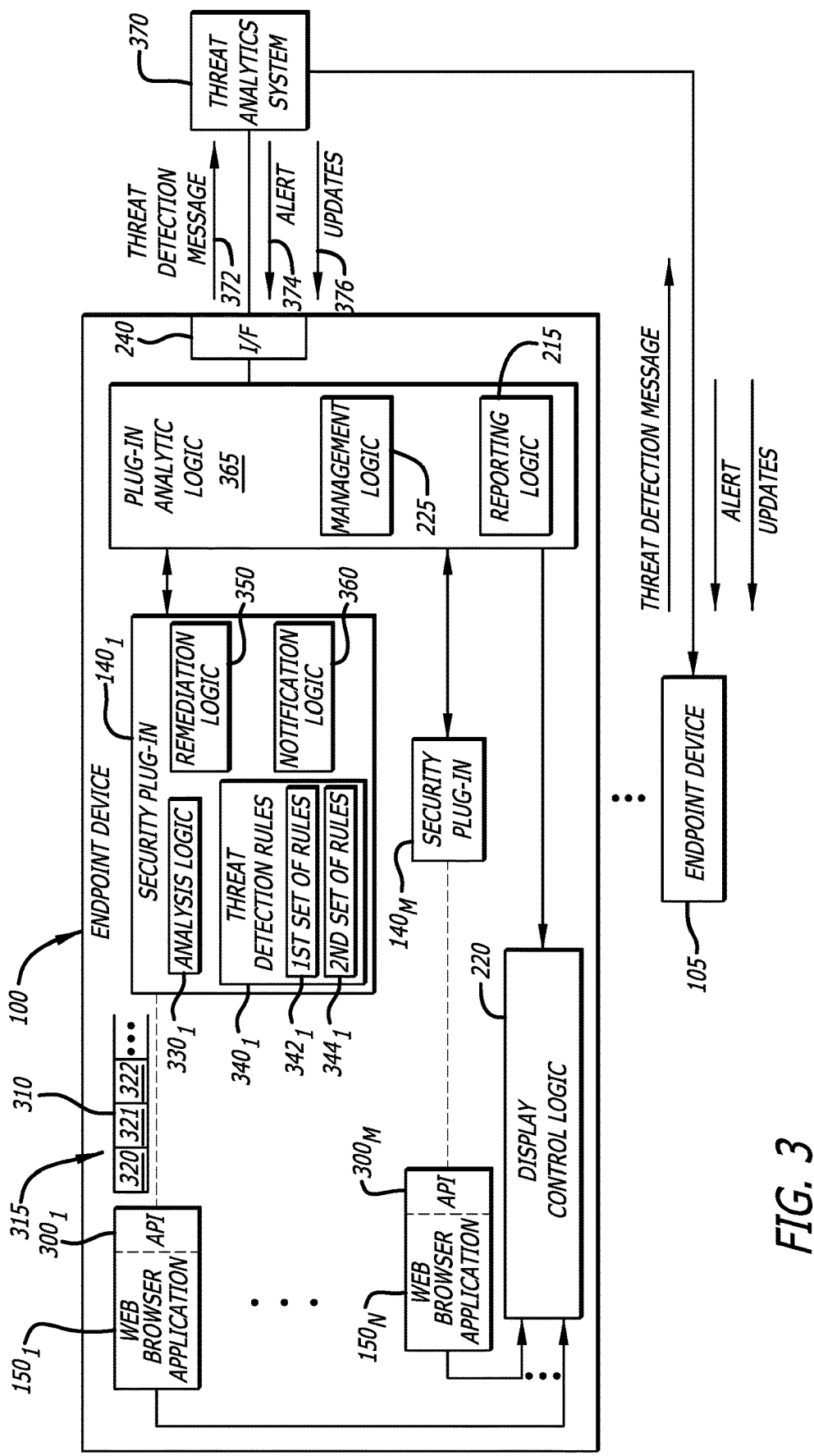
FIG. 3 is an illustrative embodiment of the logical architecture of the endpoint device of FIG. 1 employing the local threat detection system featuring one or more security plug-ins and corresponding software components.

Referring now to FIG. 2, an illustrative embodiment of the internal architecture of the endpoint device 100 and the interoperability of stored logic to provide selective detection and prevention of malicious content from being processed by an installed software component is shown. Herein, one or more software components $150_1$-$150_N$ (N≥1), including a web browser application $150_1$, is installed within the endpoint device 100 and stored in memory 200, where one or more hardware processors (generally referred to as "processor 230") execute the web browser application $150_1$ to process the web page content 120 for rendering a displayable web page on the display 160. As shown, a security plug-in $140_1$ is installed within the endpoint device 100 and is communicatively coupled to the web browser application $150_1$ in order to monitor and analyze segments of the web page content 120 prior to processing by the web browser application $150_1$. The security plug-in $140_1$ may further perform remediation actions (if any), and log information associated with any detected malicious content for reporting to an administrator or remotely located threat analytics system 370 as shown in FIG. 3.

Referring still to FIG. 2, the endpoint device 100 comprises the memory 200, the processor 230, one or more network interfaces (referred to as "network interface(s)") 240, and one or more network devices (referred to as "network device(s)") 250 connected by a system interconnect 260, such as a bus. As shown in FIGS. 1-2, these components are at least partially encased in a housing 170, which is made entirely or partially of a rigid material (e.g., hardened plastic, metal, glass, composite, or any combination thereof) that protects these components from environmental conditions.

The processor 230 is one or more multipurpose, programmable components that accept digital data as input, process the input data according to stored instructions, and provide results as output. One example of a processor may include an Intel® x86 central processing unit (CPU) with an instruction set architecture although other types of processors as described above may be utilized. The processor 230 and an operating system ("OS") 205 within the memory 200 operate to register the installed security plug-ins (e.g., security plug-in $140_1$-$140_M$ (M≥2 as shown), which are used to enhance functionality of software components $150_1$-$150_2$ installed within the endpoint device 100 by providing cyber-threat detection and prevention capabilities, as described below.

Figure 4:
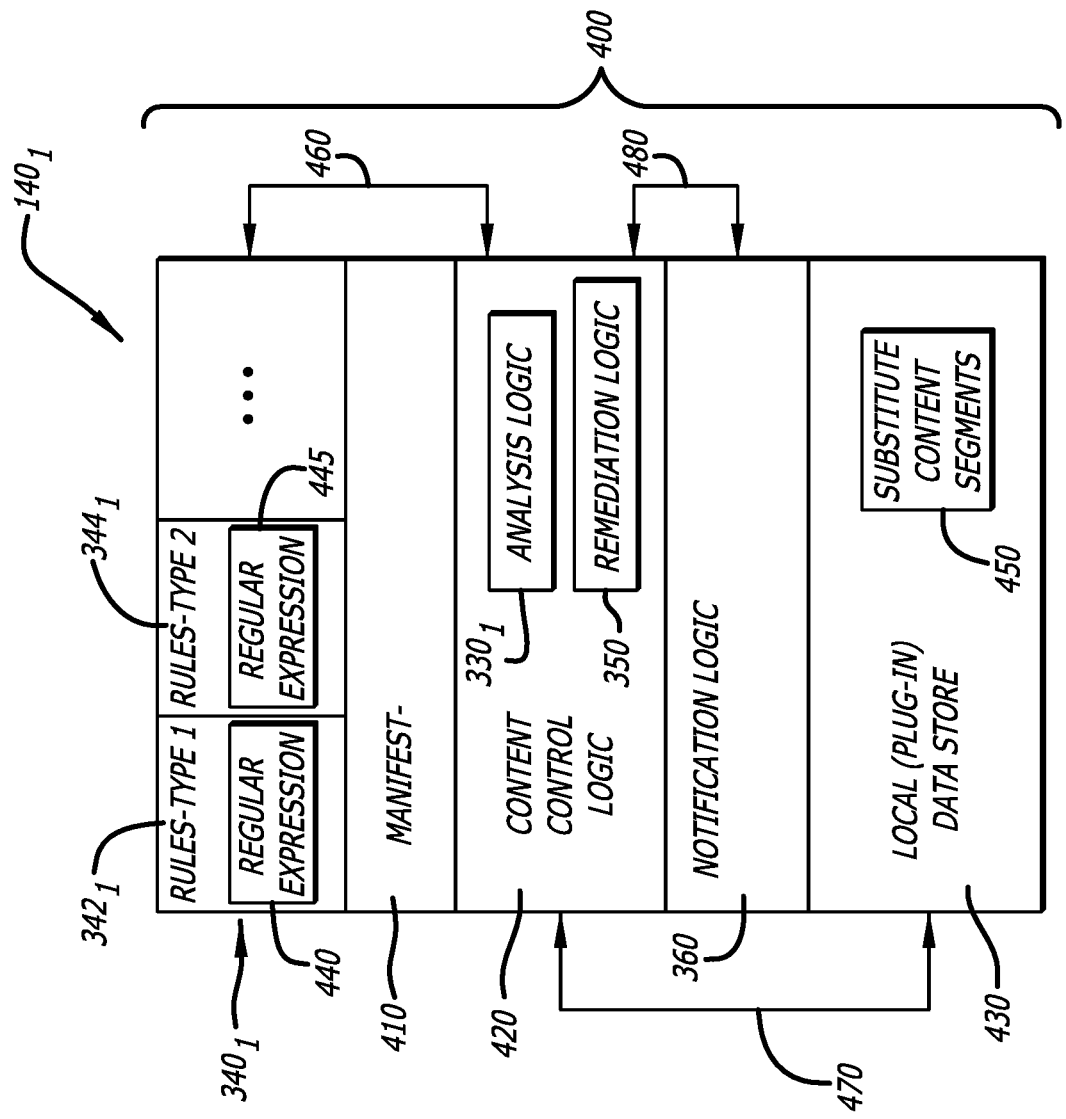
FIG. 4 is an illustrative embodiment of the data structure of a security plug-in of FIGS. 1-3.

The memory 200 may correspond to system memory along with non-persistent and/or persistent storage. From a logical perspective, the memory 200 includes the OS 205 featuring logic configured to register software plug-ins, including one or more security plug-ins $140_1$-$140_M$ (e.g., M=2). During registration, for each security plug-in (e.g., security plug-in $140_1$), a plug-in name and a path to access content associated with the security plug-in $140_1$ is registered by the OS 205. The memory 200 further includes a plurality of locations that are addressable by the processor 230 and the network interface(s) 240 for storing software components that are installed into the endpoint device 100, including one or more software applications $150_1$-$150_N$ and one or more security plug-ins $140_1$-$140_M$ that are communicatively coupled to a corresponding "M" software applications $150_1$-$150_M$ (M≤N). For illustrative purposes, the description shall focus on one or more security plug-ins $140_1$-$140_M$ operating in cooperation with counterpart software applications $150_1$-$150_M$, such as a first security plug-in $140_1$ operating in cooperation with a web browser application $150_1$. However, other security plug-ins (e.g., security plug-in $140_2$) may be adapted to provide similar cyber-threat detection and prevention functionality to other types of software components, such as a document editor application for example. The composition of each of the security plug-ins $140_1$-$140_M$, such as the first security plug-in $140_1$ for example, is illustrated in FIG. 4.

According to one embodiment of the disclosure, memory 200 further includes reporting logic 215, display control logic 220 and/or management logic 225. The reporting logic 215 generates threat detection messages (described below) for transmission via one or more network interface(s) 240 to the network 130 in order to report malicious content (e.g., malware) detected by any of the security plug-ins $140_1$-$140_M$ to a remote threat analytics system 370 as illustrated in FIG. 3. The display control logic 220 is configured to assist in the rendering of displayable objects on the display 160, such as one or more alerts including information identifying the presence of malicious content within the received content 120 and/or including meta information associated with the malicious content (e.g., source name, type of content compromised, underlying security plug-in and its associated application, malware family identified, etc.) based on operations conducted by logic within each of the security plug-ins $140_1$-$140_M$. Lastly, the management logic 225 is configured to coordinate the collective operability of the security plug-ins $140_1$-$140_M$ such as coordinating transmission of threat detection messages from different security plug-ins $140_1$-$140_M$ via the network interface(s) 240 for example. For example, the operability of some security plug-ins (e.g., security plug-in $140_{M-1}$) may be dependent on completion of operation by other security plug-ins (e.g., security plug-in $140_M$). Additionally, the management logic 225 is configured to coordinate the collective operability of the security plug-ins $140_1$-$140_M$ in rendering a verdict (e.g., malicious or non-malicious) for one or more content segments operated upon by the security plug-ins $140_1$-$140_M$.

Herein, the network device(s) 250 may include various input/output (I/O) or peripheral devices, such as a keyboard, key pad, touch screen, or mouse for example. The network interface(s) 240 may include one or more network ports containing the mechanical, electrical and/or signaling circuitry needed to connect the endpoint device 100 to the network 130 to thereby facilitate communications to other remotely located electronic devices. To that end, the network interface(s) 240 may be configured to transmit and/or receive messages using a variety of communication protocols including, inter alia, Transmission Control Protocol/Internet Protocol (TCP/IP), Hypertext Transfer Protocol (HTTP), or HTTP Secure (HTTPS).

III. OPERATIONAL FLOW OF THE LOCAL THREAT DETECTION SYSTEM

As shown in FIG. 3, an illustrative embodiment of the logical architecture of the endpoint device 100 employing the local threat detection system 110 is shown. The local threat detection system 110 features "M" security plug-ins $140_1$-$140_M$, where each security plug-in $140_1$ . . . or $140_M$ I is communicatively coupled to a corresponding software component $150_1$ . . . or $150_M$ via a standard, published interface $300_1$-$300_M$ offered by each of the software components $150_1$-$150_M$, respectively. As shown, according to this embodiment of the disclosure, a first security plug-in $140_1$ is communicative coupled to a web browser application $150_1$ with an application programming interface (API) $300_1$ specific to and offered by the web browser application $150_1$.

According to one embodiment of the disclosure, the first security plug-in $140_1$ may be a separate software module from the web browser application $150_1$ as shown. Although, as another embodiment of the disclosure, the first security plug-in $140_1$ may be integrated into the web browser application $150_1$. Regardless of the manner of deployment, the first security plug-in $140_1$ is configured to monitor the API $300_1$ provided by the web browser application $150_1$ in order to intercept content 310 received for processing. The content 310 may include a plurality of content segments 315, where each of the plurality of content segments 315 corresponds to information associated with different element of a web page (e.g., web page header, display image, JavaScript block, Flash file, pop-up buttons, etc.). Prior to the processing of the content 310 by the web browser application $150_1$, analysis logic $330_1$ within the first security plug-in $140_1$ parses the content 310 by detecting the different types of content segments 315 forming the web page 310. Thereafter, the analysis logic $330_1$ analyzes each content segment of the plurality of content segments 315 in accordance with a set of threat detection rules $340_1$ directed to a particular type of security plug-in $140_1$ for use in analyzing certain types of content segments (e.g., content segment 321) and determining whether a particular content segment is malicious or not.

According to one embodiment of the disclosure, the analysis logic $330_1$ analyzes each content segment 315 within the web page 310 by identifying the type of content segment being analyzed, and thereafter, comparing information within the content segment to regular expressions being part of a particular set of threat detection rules $340_1$ that are used to detect cyber-threats for that particular type of content segment. For example, the threat detection rules $340_1$ may include a first set of threat detection rules $342_1$ utilized by the analysis logic $330_1$ to determine whether a first type of content segment is malicious while a second set of threat detection rules $344_1$, which may be wholly or partially different from the first set of threat detection rules $342_1$, may be utilized by the analysis logic $330_1$ to determine whether a second type of content segment is malicious.

The regular expressions may correspond to information (e.g., data, meta information, etc.) associated with content within known malicious web pages (e.g., phishing web pages, etc.). Upon determining that a first content segment 321 is malicious, the security plug-in $140_1$ may selectively prohibit further processing of this content segment 321 by the web browser application $150_1$ (e.g., block further processing of content loaded via an Inline Frame "Iframe," prevent display of a malicious image in document being rendered, etc.). Otherwise, where the particular content segment 321 is non-malicious, the analysis logic $330_1$ does not modify the first content segment 321 and permits the web browser application $150_1$ to process the first content segment 321.

More specifically, the remediation logic 350 of the security plug-in $140_1$ may operate on the first content segment 321 to mitigate its maliciousness. According to one embodiment of the disclosure, the remediation logic 350 may be configured to substitute the first content segment 321 for a prescribed, non-malicious content segment stored within a data store 270 external to the security plug-in $140_1$ as shown in FIG. 2. As one example, where the malicious content segment is a displayable image, a substitute content segment may correspond to a benign image, where the image may be updated to provide "paid for" advertisements in which the data store 270 of FIG. 2 is occasionally updated to include non-malicious content provided from subscribers to a service, which is responsible for uploading substitute content segments operating as advertisements to different endpoint devices or electronic devices accessible to the endpoint devices for use by the remediation logic 350, as needed. Alternatively, the image may be removed, such as in a malicious redirection element, where non-malicious content is not substituted with malicious content.

In lieu of content segment substitution, according to another embodiment of the disclosure, the remediation logic 350 may be configured to alter content within a malicious content segment 321 in order to remove its maliciousness prior to processing by the browser software application $150_1$. As a first illustrative example, the remediation logic 350 may be configured to disconnect a URL link assigned to the content segment 321 so that the content segment 321 is displayed as a blank area in a rendered web page. As a second illustrative embodiment, the remediation logic 350 may be configured to alter the URL link assigned to the content segment 321, which may cause a display of either (i) a prescribed advertisement stored as part of the security plug-in $140_1$ or retrieved from a linked resource (as described above) or (ii) a warning that at least one of the content segments 315 has been determined to be malicious. As a result, this software framework protects software components within the endpoint device 100 from becoming infected with malicious content (e.g., content segments) while allowing software components to process the legitimate, non-malicious content for subsequent rendering to avoid impeding the conveyance of information.

In summary, the software framework provided by the local threat detection system 110 possesses the capability to analyze and selectively prevent malicious content (code) segments from being processed without limiting access to (or rendering of) to the legitimate content. Depending on the type of malicious content segment, each security plug-in $140_1$ . . . , and/or $140_M$ may selectively suppress a rendering of content associated with a malicious content segment and replace this content segment with a notice or benign substitute content (e.g., an image, flash file, JavaScript block or the like which may or may not operate as an advertisement). By selectively blocking and/or suppressing malicious content without interfering with the legitimate (non-malicious) content, the local threat detection system 110 enables the display of a web page with legitimate content segments remaining intact and malicious content segment(s) being altered or substituted to remove malware from content forming the web page.

Additionally, or in the alternative, the security plug-in $140_1$ may include notification logic 360, which is configured to issue an alert provided to the display control logic 220. The separate alert may be superimposed over an area of the web page. The superimposed area may or may not cover an area of the web page associated with any substitute content segment. The notification logic 360 may be further configured to provide information for use by plug-in analytic logic 365 in the generation of the threat detection message 372 routed to the remote threat analytics system 370.

As shown, the security plug-in $140_1$ may be configured to communicate with the plug-in analytic logic 365, including the reporting logic 215 and the management logic 225. The reporting logic 215 is configured to generate one or more threat detection messages 372 for transmission via the network interface 240 to the threat analytics system 370 based on information received from the notification logic 360. The management logic 225 is configured to coordinate the collective operability of the security plug-ins $140_1$-$140_M$ such as coordinating transmission of threat detection messages based on information from different security plug-ins $140_1$-$140_M$ via the network interface 240 for example. The threat detection message 372 may include results from an analysis of a content segment (e.g., content segment 321) conducted by the analysis logic $330_1$ within the security plug-in $140_1$. Based on the threat detection message 372 (and other threat detection messages from different security plug-ins within the endpoint device 100 (e.g., security plug-in $140_2$, etc.)), the threat analytics system 370 generates alert messages 374 to other endpoint devices (e.g., endpoint device 105) communicatively coupled thereto.

Herein, according to one embodiment of the disclosure, the threat detection message 372 includes a timestamp, an application identifier (e.g., data identifying the name and/or version number of the application), rule identifier (e.g., data identifying one or more rules violated by the content segment 321), a source identifier (e.g., URL), and/or sequence of characters (string) associated with the content segment that matched one or more regular expressions being part of the threat detection rules utilized by the analysis logic to classify the malicious content segment. Herein, the rule identifier may be sufficient information to track the processing of the threat detection message 372. Herein, the threat analytics system 370 may further provide updates 376 to one or more of the security plug-ins $140_1$-$140_M$ (e.g., rules, manifest, notification logic, etc.), although such updates may be provided from a different resource.

Referring now to FIG. 4, an illustrative embodiment of the data structure 400 of a security plug-in (e.g., security plug-in $140_1$) and the interoperability of logic to provide selective prevention of malicious content from being processed by a selected application installed within the endpoint device 100 is shown. Herein, the security plug-in $140_1$ includes threat detection rules $340_1$, a manifest 410, content control logic 420, notification logic 360 and a local data store 430.

The threat detection rules $340_1$ include one or more sets of threat detection rules that are categorized by segment type. More specifically, according to one embodiment of the disclosure, each of the threat detection rules $340_1$ includes one or more regular expressions (hereinafter, "regular expression(s)"), namely a sequence of alphanumeric characters that define a search pattern for use by analysis logic $330_1$ being part of the content control logic 420, to determine a level of correlation between any of the regular expression(s) and information within a content segment under analysis. For instance, the threat detection rules $340_1$ may include a first set of threat detection rules $342_1$ associated with a first segment type (e.g., images) and a second set of threat detection rules $344_1$ associated with a second segment type (e.g., JavaScript block). The first set of threat detection rules $342_1$ include a first group of regular expression(s) 440 and the second set of threat detection rules $344_1$ include a second group of regular expression(s) 445, where the regular expression(s) 440 may differ, either completely or at least partially, from the regular expression(s) 445.

The manifest 410 is a collection of information (e.g., a file, etc.) that includes meta information associated with the security plug-in $140_1$ and, when loaded, operates to alters permissions of a software component to allow the security plug-in $140_1$ to interact with the software component $150_1$. For instance, as an illustrative example, the manifest 410 of the security plug-in $140_1$ may be configured to alter permissions of the web browser application $150_1$ to allow the content control logic 420 of the security plug-in $140_1$ to intercept, analyze and return web content 310 of FIG. 3, which may be altered or unaltered, prior to processing by the web browser application $150_1$. The manifest 410 authenticates the security plug-in $140_1$ to monitor the web content 310 via a standard, published interface (API) made available by the web browser application $150_1$. Also, the manifest 410 further allows the security plug-in for certain application.

Referring still to FIG. 4, the content control logic 420 includes the analysis logic $330_1$ and the remediation logic 350. As described above, the analysis logic $330_1$ is configured to receive the web content 310, identify and parse the web content 310 into separate content segments 315, and analyze each of the content segments to determine maliciousness, as shown in FIG. 3. The analysis of the content segments 315 includes identifying a particular type of content segment being analyzed, such a first type of content segment 321 for example; and retrieving regular expressions $342_1$ that pertain to known malicious content and are associated with the threat detection rules $340_1$ for that particular (first) segment type (as represented by communication path 460). Thereafter, the analysis logic $330_1$ of the content control logic 420 conducts a comparison of data within the content segment 321 to the retrieved regular expressions 440 to determine whether a level of correlation exceeds a threshold. If so, the content segment under analysis is determined to be malicious.

According to one embodiment of the disclosure, for certain segment types, the remediation logic 350 may be configured to remove malicious content segments to prevent the rendering of a displayable element associated with the malicious content that, if selected, would have infected the endpoint device with malware. Depending on the type of malicious content (e.g., a displayable image), a prescribed content segment may be substituted for the removed content segment to complete the web page. According to one embodiment of the disclosure, the prescribed content segment may correspond to an advertisement image (linked or static) for which advertisers subscribe to a service that updates a collection of substitute content segments 450 that may be maintained within the local data store 430 and is utilized by the remediation logic 350 as represented by communication path 470. Additionally, or in the alternative, the substitute content segments 450 may be stored remotely within the data store 270 of FIG. 2 and accessed as needed. The substitute content segments 450 may correspond to advertisements for placement with the rendered web page in lieu of malicious displayable element or a pre-stored image that occupies area within the web page and/or operates as a warning to the user that a portion of the web page content has been determined to be malicious. Hence, the remediation logic 350 protects the endpoint device, and notably the web browser application $150_1$, from becoming infected with malicious content while allowing the web browser application $150_1$ to process the legitimate, non-malicious content for subsequent rendering. As a result, certain valuable (and legitimate) information may still be rendered instead of precluding display of the entire web page.

The notification logic 360, operating with the content control logic 420 as represented by communication path 480, provides information for use by the plug-in analytic logic 365 in the generation of the threat detection message 372 routed to the remote threat analytics system 370 of FIG. 3, which generates one or more alert messages 374 to share malicious content findings among a corresponding (one or more) endpoint devices, including the endpoint device. As described above, the threat detection message 372 includes a timestamp that identifies a time of receipt of the malicious content, an application identifier that identifies the name and/or version number of the web browser application $150_1$, rule identifier that identifies one or more regular expressions correlated with the malicious content, and a source URL (to detect origination of any detected cyberattack) along with one or more regular expressions relied upon to classify the malicious content segment. The local data store 430 may be configured to operate as temporary storage for information associated with the uncovered malicious content segments, where at least a portion of the information is provided to the plug-in analytic logic 365 to generate the threat detection message 372.

Figure 5:
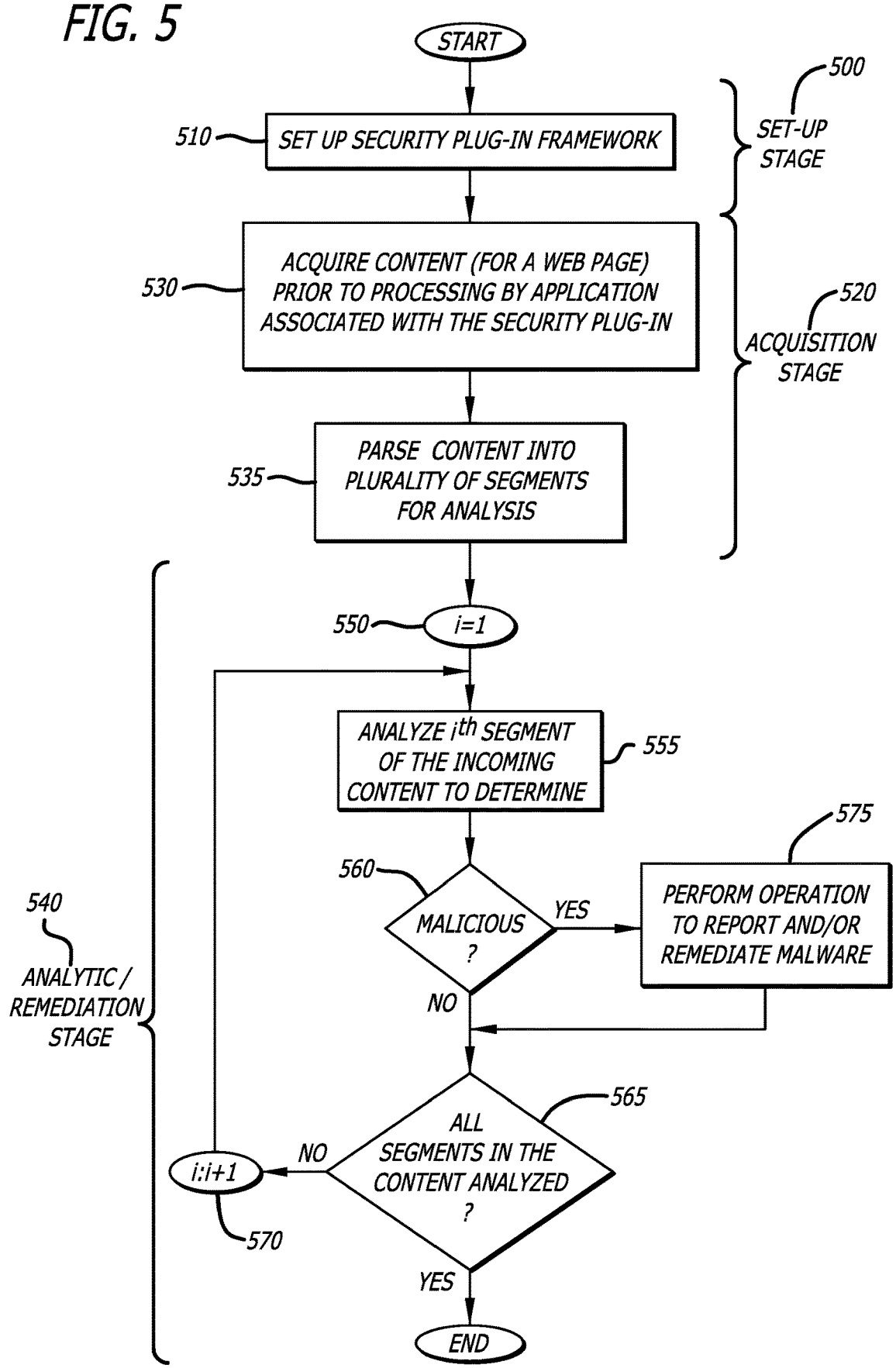
FIG. 5 is an exemplary embodiment of a flow diagram of the operations conducted by the local threat detection system of FIG. 1.

Referring to FIG. 5, an exemplary embodiment of a flow diagram of the operations conducted by the local threat detection system to detect incoming malicious content is shown. Herein, these operations may be categorized into three stages: Set-up stage 500, Acquisition stage 520 and Analytic/Remediation stage 540. With respect to the Set-up stage 500, a security plug-in framework is established, which provides crypto-threat detection and prevention functionality to general software applications operating on an endpoint device (operation 510). Thereafter, during the Acquisition stage 520, content for a web page is acquired prior to processing of the content by a software component (e.g., web browser application) associated with the security plug-in (operation 530). The acquired content is parsed into a plurality of segments (operation 535), which are separately analyzed for malicious content.

More specifically, during the Analytic/Remediation stage 540, an $i^{th}$ content segment (count "i" initially set to "1") is analyzed to determine whether that particular segment is malicious or non-malicious (operations 550, 555 and 560). Where the $i^{th}$ content segment is not malicious, a determination is made whether all of the content segments associated with the acquired, incoming content have been analyzed (operation 565). If not, the count is incremented (i:=i+1) and the next $(i+1^{th})$ content segment is analyzed (operations 570, 555). However, where the $i^{th}$ content segment is malicious, additional operations may be conducted on the content segment associated with the incoming content in order to report findings or remediate malicious content as described above (operation 575).

Referring now to FIG. 6A, an exemplary embodiment of a flow diagram of the operations conducted during the Set-up stage 500 of FIG. 5 with respect to set-up of the security plug-in framework is shown. Herein, a security plug-in is configured to monitor and operate with a web browser application, is installed within memory of an endpoint device (operation 600). Upon opening the web browser application (operation 605), the security plug-in determines whether permission settings for the web browser application have been altered by its manifest, which allows the security plug-in to monitor data loaded into the web browser application via a published interface (API) (operation 610). If not, for certain types of web browser applications, such as a Microsoft® Edge® web browser for example, the security plug-in would initially provide a plug-in digital signature to be verified by the web browser application (operation 615). Without verification of a valid digital signature by the security plug-in, the web browser application would deny alteration of its permission setting (operation 620). These optional nature of these operations is represented by dashed lines. However, upon verification of the valid digital signature or for other types of web browser applications that do not require verification, such as FireFox® for example, the manifest includes code that alters the permission setting of the web browser application to allow for the security plug-in to access loaded content prior to processing by the web browser application (operation 625).

Figure 6B:
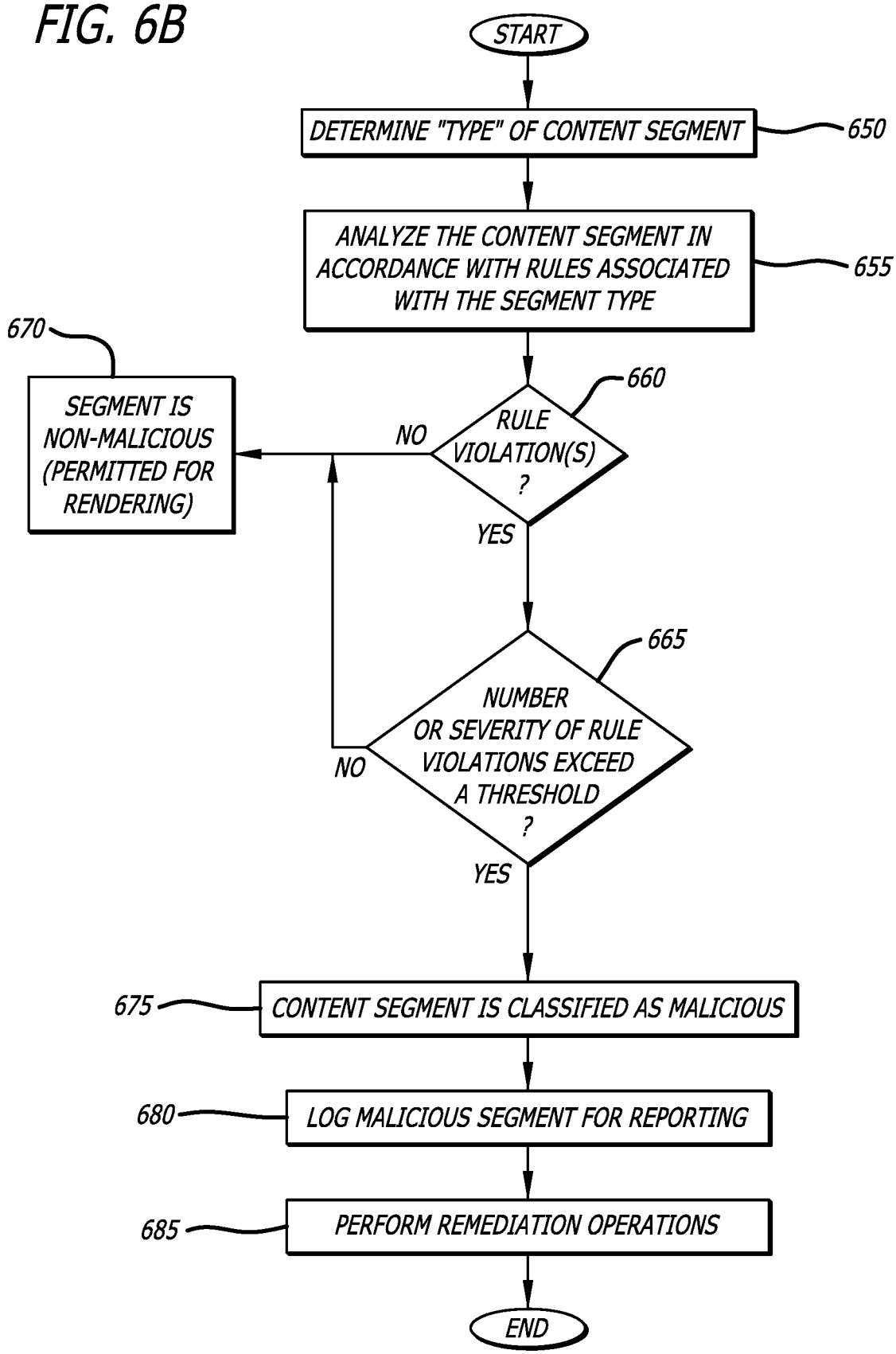
FIG. 6B is an exemplary embodiment of a flow diagram of the operations conducted during the Analytic/Remediation stage of FIG. 5.

Referring to FIG. 6B an exemplary embodiment of a flow diagram of the operations conducted during the Analytic/Remediation stage 540 of FIG. 5 is shown. Herein, a type of content segment under analysis is determined and the content segment is analyzed in accordance with threat detection rules associated with the determined segment type (operations 650 and 655). Based on this analysis, a determination is made whether a rule violation has occurred (operations 660-670). For instance, according to one embodiment of the disclosure, a rule violation may be determined based on whether a correlation between the data within the content segment and one or more regular expressions included as part of the threat detection rules for the determined segment type exceed a prescribed threshold.

As further shown in FIG. 6B, if no rule violation has occurred (or the severity of the rule violation does not exceed the prescribed threshold), the content segment is classified as non-malicious (operations 665 and 670). Otherwise, the content segment is classified as malicious (operation 675). Additionally, the malicious content segment may be logged for reporting (operation 680) and/or may undergo remediation operations, as described above, where the type of remediation operation is based, at least in part, the segment type (operation 685). For example, where the content segment is code directed to a static or linked displayable image to be rendered on a display, the remediation may be directed to substitution of the code with a new displayable image to complete the web page. The new displayable image may be an image operating as an advertisement, a warning or merely a safe image occupying the same area of the web page as the malicious displayable image. Similarly, where the content segment attempts a URL redirect operation, the remediation may involve substitution of the entire web page with a warning notice rendered on the display.

Figure 7:
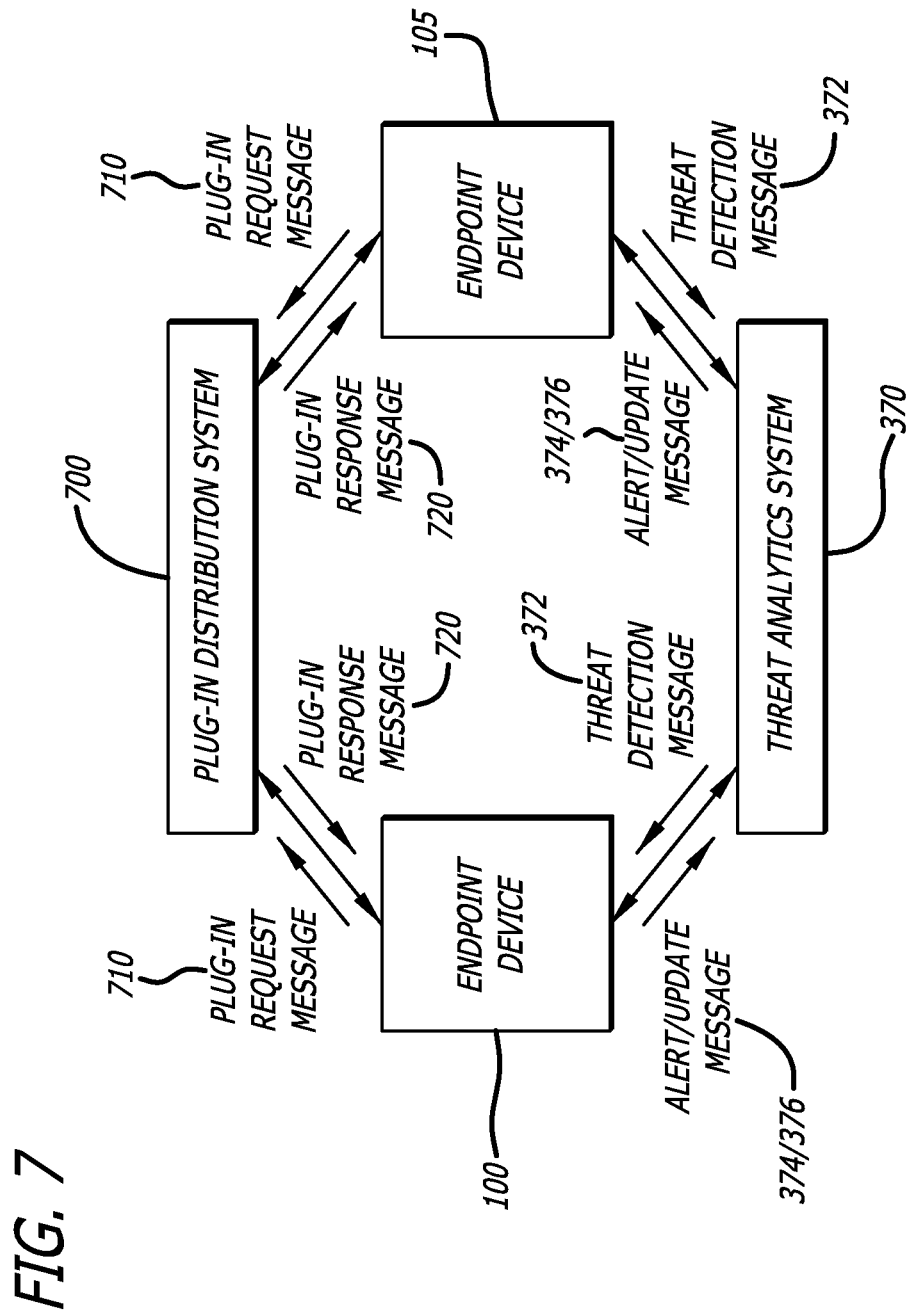
FIG. 7 is an exemplary embodiment of a plug-in distribution system for downloading security plug-ins to requesting electronic devices.

Referring now to FIG. 7, an exemplary embodiment of a plug-in distribution system 700 for downloading security plug-ins $140_1$-$140_M$ is shown. Herein, the plug-in distribution system 700 may provide a subscription-based service in which different levels or tiers of security plug-ins may be downloaded by the endpoint device 100 based on a subscription level associated with the endpoint device 100 or a subscriber using the endpoint device 100. More specifically, upon establishing communications with the endpoint device 100, the plug-in distribution system 700 analyzes credentials supplied by the endpoint device 100 (e.g., registered device identifier such as a unique Media Access Control (MAC) address, manufacture serial number, etc.) to determine whether an active subscription exists for a user of the endpoint device 100 (or the endpoint device 100).

Without a security plug-in subscription, as a free-service, the endpoint device 100 may be permitted to download first tier security plug-ins that perform local threat detection and prevention, without any remediation or reporting capabilities. Hence, a first tier security plug-in provides a threat detection enhancement for a web browser application, which allows for detection a malicious content segment prior to processing of the content by the web browser application. However, the first tier security plug-in may not be configured to perform image substitution or reporting of meta-information associated with a detected cyber-threat to a threat analytics system as described above and illustrated in FIG. 3. With an active security plug-in subscription, the endpoint device 100 may be permitted to download second tier security plug-ins, which includes remediation and/or reporting capabilities.

As shown in FIG. 7, automatically or when initiated by the user, the endpoint device 100 sends a plug-in request message 710 to the plug-in distribution system 700. Depending on the credentials associated with the endpoint device 100, the plug-in distribution system 700 returns a plug-in response message 720 to the endpoint device 100. The plug-in response message 720 includes an appropriate tiered security plug-in (e.g., security plug-in $140_1$), which is installed within the endpoint device 100 and provides enhanced cyber-threat detection and prevention to a corresponding software component (e.g., web browser application $150_1$). Where the endpoint device 100 and/or endpoint device 105 are devices associated with a subscriber or subscribers to the security plug-in subscription, the security plug-in $140_1$ may upload threat detection messages to the threat analytics system 370, where alerts and/or update messages may be received from the threat analytics system 370 by the endpoint device 100 and/or endpoint device 105.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. An endpoint device, comprising:
one or more hardware processors; and
a memory coupled to the one or more hardware processors, the memory comprises
management logic,
a plurality of software components, and
a plurality of security plug-ins corresponding to the plurality of software components stored within the endpoint device, the plurality of security plug-ins comprise a first security plug-in communicatively coupled to an interface of a first software component of the plurality of software components and a second security plug-in communicatively coupled to an interface of a second software component of the plurality of software components, wherein the first security plug-in of the plurality of security plug-ins including logic configured to gain access to a first type of content that includes web page content and the second security plug-in including logic configured to gain access to a second type of content that is different from the first type of content, wherein both of the first security plug-in and the second security plug-in are configured to (i) parse received content, being the first type of content or the second type of content, into a plurality of content segments, wherein each content segment of the plurality of content segments is lesser in size than the received content and pertaining to a different category of content for analysis, wherein each content segment of the plurality of content segments has at least one of a plurality of segment types, wherein the plurality of segment types at least comprise an executable segment type and a non-executable segment type, (ii) locally analyze each content segment of the plurality of content segments, using one or more different threat detection rules pertaining to at least one of the plurality of segment types, and determine whether each content segment of the plurality of content segments is malicious or non-malicious, and (iii) permit rendering of one or more non-malicious content segments of the plurality of content segments by performing a remediation operation by at least replacing each malicious content segment corresponding to a displayable image with an advertisement image obtained from a data store including advertisement images that are updated as part of a service to which advertisers can subscribe, and by preventing further processing of one or more malicious content segments of the plurality of content segments, wherein the management logic is configured to coordinate collective operability of the plurality of security plug-ins based on reported threat information to render a verdict for at least one content segment of the plurality of content segments.

2. The endpoint device of claim 1, wherein at least the first security plug-in is configured to gain access to the received content via an application programming interface (API) provided by the software component.

3. The endpoint device of claim 1, wherein at least the first security plug-in is configured to gain access to the received content via one or more operating system interfaces.

4. The endpoint device of claim 2, wherein at least the first software component corresponds to a web browser application.

5. The endpoint device of claim 2, wherein at least the first software component corresponds to a word processing application.

6. The endpoint device of claim 1, wherein the first security plug-in is configured to analyze a first content segment and determine whether the first content segment is malicious or non-malicious by at least (i) identifying a type of content segment being analyzed and (ii) comparing information within the first content segment to regular expressions being part of threat detection rules associated with the type of content segment identified.

7. The endpoint device of claim 1, wherein the advertisement image corresponds to a paid advertisement obtained from the data store that is periodically or aperiodically uploaded with substitute content segments.

8. The endpoint device of claim 7, wherein the substitute content segments maintained within the data store are updated by the service to which advertisers subscribe.

9. The endpoint device of claim 1, wherein each content segment corresponds to a JavaScript® block.

10. The endpoint device of claim 1, wherein the memory further comprising:

notification logic configured to issue an alert provided to display control logic, wherein the alert is superimposed over an area of a web page.

11. A non-transitory computer readable medium including management logic and a plurality of security plug-ins communicatively coupled to a software component and, upon execution, performing operations comprising:

gaining access, by each security plug-in of the plurality of security plug-ins, to a different type of content in which a first security plug-in is configured to gain access to a first type of content that includes web page content and a second security plug-in is configured to gain access to a second type of content that includes a non-executable and is different from the first type of content;

parsing, by both the first security plug-in and the second security plug-in, received content, being the first type of content or the second content, into a plurality of content segments, wherein each content segment of the plurality of content segments is lesser in size than the received content, wherein each content segment of the plurality of content segments has at least one of a plurality of segment types, wherein the plurality of segment types at least comprise an executable segment type and a non-executable segment type;

locally analyzing, by the first security plug-in and the second security plug-in, each content segment of the plurality of content segments, using one or more different threat detection rules pertaining to at least one of the plurality of segment types, and determine whether each content segment of the plurality of content segments is malicious or non-malicious; and permitting, by the first security plug-in and the second security plug-in, a rendering of one or more non-malicious content segments of the plurality of content segments by performing a remediation operation by at least replacing each malicious content segment corresponding to a displayable image with an advertisement image obtained from a data store including advertisement images that are updated as part of a service to which advertisers can subscribe, and by preventing further processing of one or more malicious content segments of the plurality of content segments, wherein the management logic is configured to coordinate collective operability of the plurality of security plug-ins based on reported threat information to render a verdict for at least one content segment of the plurality of content segments.

12. The non-transitory computer readable medium of claim 11, wherein the first security plug-in, upon execution by a processor, is configured to gain access to the content via an application programming interface (API) provided by the software component.

13. The non-transitory computer readable medium of claim 11, wherein the first security plug-in, upon execution by the processor, to gain access to the received first type of content via one or more operating system interfaces.

14. The non-transitory computer readable medium of claim 12, wherein the software component corresponds to a web browser application.

15. The non-transitory computer readable medium of claim 12, wherein the software component corresponds to a word processing application.

16. The non-transitory computer readable medium of claim 11, wherein the first security plug-in, upon execution by the processor, is configured to analyze a first content segment and determine whether the first content segment is malicious or non-malicious by at least (i) identifying a type of content segment being analyzed and (ii) comparing information within the first content segment to regular expressions being part of threat detection rules associated with the type of content segment identified.

17. The non-transitory computer readable medium of claim 11, wherein the advertisement image corresponds to a paid advertisement that is obtained from the data store and the data store is periodically or aperiodically uploaded with substitute content segments.

18. The non-transitory computer readable medium of claim 11, wherein the first security plug-in, upon execution by the processor, is configured to permit processing of the one or more non-malicious content segments by performing a second remediation operation by removing linking capability for each malicious content segment.

19. The non-transitory computer readable medium of claim 11, wherein each content segment corresponds to a JavaScript® block.

20. A method for modifying a web page by a plurality of security plug-ins that are deployed within an endpoint device and each configured to detect and remove one or more malicious content segments directed to a cyberattack within a web page and rendering of the modified web page, comprising:

gaining access, by each security plug-in of the plurality of security plug-ins, to a different type of content in which a first security plug-in is configured to gain access to a first type of content that includes web page content and a second security plug-in is configured to gain access to a second type of content that includes a non-executable and is different from the first type of content;

parsing, by both the first security plug-in and the second security plug-in, received content, being the first type of content or the second content, into a plurality of content segments, wherein each content segment of the plurality of content segments is lesser in size than the received content, wherein each content segment of the plurality of content segments has at least one of a plurality of segment types, wherein the plurality of segment types at least comprise an executable segment type and a non-executable segment type;

locally analyzing, by the first security plug-in and the second security plug-in, each content segment of the plurality of content segments, using one or more different threat detection rules pertaining to at least one of the plurality of segment types, and determine whether each content segment of the plurality of content segments is malicious or non-malicious; and permitting, by the first security plug-in and the second security plug-in, a rendering of one or more non-malicious content segments of the plurality of content segments by performing a remediation operation by at least replacing each malicious content segment corresponding to a displayable image with an advertisement image obtained from a data store including advertisement images that are updated as part of a service to which advertisers can subscribe, and by preventing further processing of one or more malicious content segments of the plurality of content segments, wherein management logic within the endpoint device is configured to coordinate collective operability of the plurality of security plug-ins based on reported threat information to render a verdict for at least one content segment of the plurality of content segments.

* * * * *